Patented Aug. 28, 1951

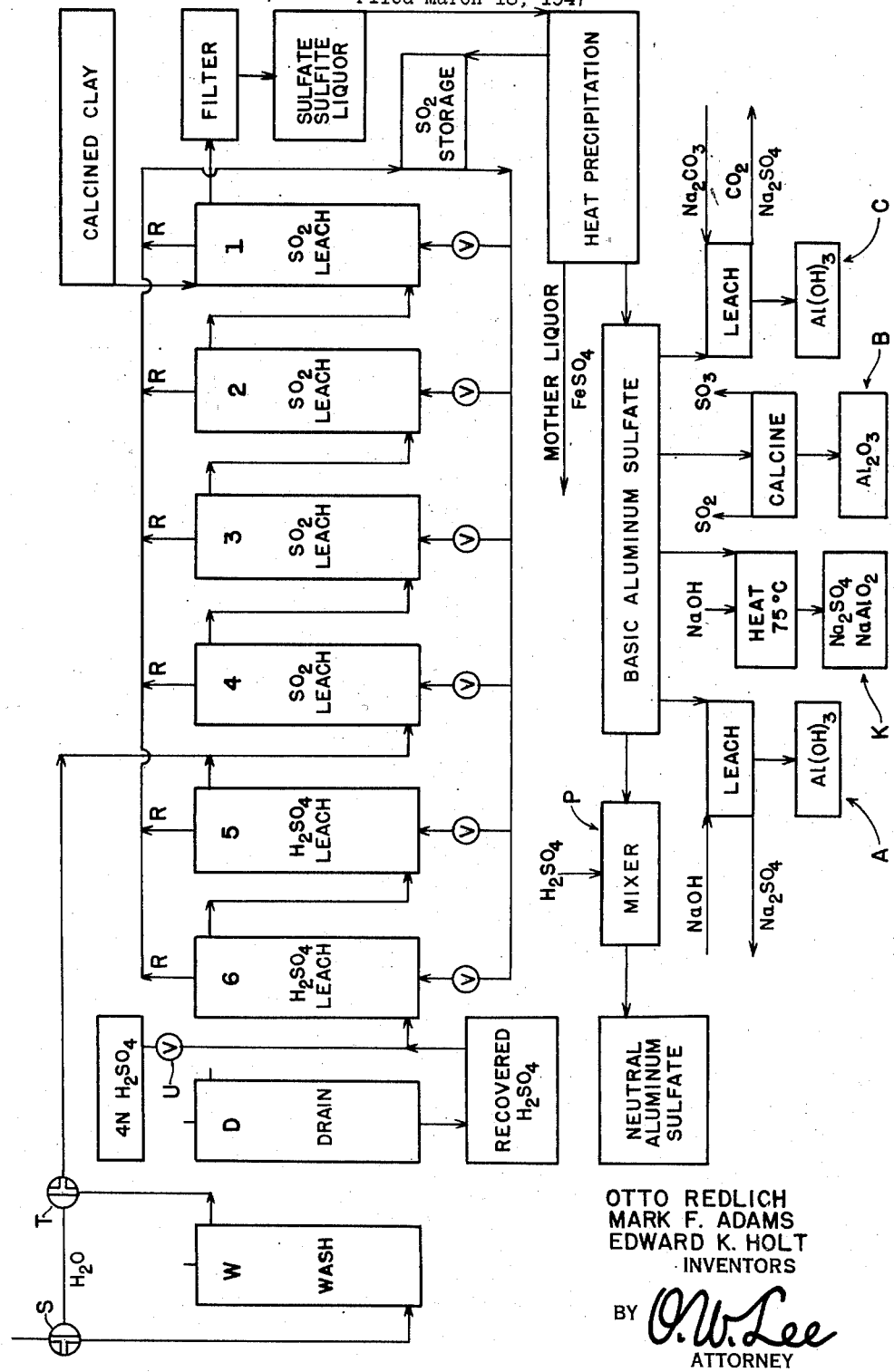

2,566,143

UNITED STATES PATENT OFFICE 2,566,143

PRODUCTION OF ALUMINUM COMPOUNDS

Otto Redlich, Berkeley, Calif., and Mark F. Adams and Edward K. Holt, Pullman, Wash., assignors to State College of Washington Research Foundation, Pullman, Wash., a corporation of Washington Application March 18, 1947, Serial No. 735,496

15 Claims. (Cl. 23—52)

The present invention relates to certain new and useful improvements in the production of aluminum compounds from clays and other aluminiferous materials which do not contain an appreciable amount of an acid constituent other than silica, and involves leaching with sulfurous acid and sulfuric acid, and subsequent precipitation of a basic aluminum sulfate by expulsion of sulfur dioxide from the sulfate-sulfite leach liquor.

According to the present invention, sulfuric acid leaching is used to supplement sulfurous acid leaching, so as to extract a greater percentage of the alumina content of the calcined clay than is possible by leaching with sulfurous acid only. That is to say, when calcined clay is leached with sulfurous acid only, the rate of extraction becomes inefficient before an economically practical percentage of the alumina has been dissolved, and the present invention overcomes this difficulty by first leaching with sulfurous acid and then subjecting the residue to further leaching with sulfuric acid which is a much more efficient leaching agent and will extract most of the alumina left undissolved by the sulfurous acid leach. The proportion of sulfuric acid leaching is controlled so that the combined sulfate and sulfite leach liquors will contain sufficient sulfate ion to enable the alumina to be precipitated as a basic aluminum sulfate substantially free from basic aluminum sulfite.

Efficient precipitation as a basic aluminum sulfate is assured by controlling the ratio so that the sulfate-sulfite leach liquor contains more than one mole of alumina per mole of available sulfate i. e. sulfate ion in excess of cations other than aluminum ion and hydrogen ion. That is to say, at least 3 equivalents of alumina to 1 equivalent of available sulfate ion, but preferably the ratio is maintained at approximately 5 equivalents of alumina to 1 equivalent of sulfate ion, as that is the optimum which assures maximum efficiency in the precipitation of basic aluminum sulfate, and minimizes the amount of alumina which would otherwise be left in solution as aluminum sulfate.

The basic aluminum sulfate is precipitated directly from the sulfate-sulfite leach liquor without resorting to the addition of any reagent, and there is also the advantage that the mother liquor contains essentially nothing but impurities, so there are no reagents nor constituents of the ore to be recovered from the mother liquor.

The invention greatly simplifies the extraction of alumina from clay; and the resulting basic aluminum sulfate can be converted into other aluminum compounds much more economically than is possible with neutral aluminum sulfate obtained by various prior art processes. The invention affords considerable saving in the amount of reagents required, and also affords a substantial saving in the amount of heat required. The high percentage of alumina extracted also affords a further economy by reducing the amount of clay to be handled. Further economy is effected by eliminating certain steps which are necessary in prior art processes proposed for extracting alumina from clay.

A preferred example of the invention is illustrated in the accompanying drawing which shows a flow sheet wherein counter-current leaching is employed to extract the alumina from the calcined clay. As here shown, the several leaching towers 1, 2, 3, 4, 5 and 6 are connected together in series, and $SO_2$ is fed to each tower through suitable valves as shown, and each tower has a $SO_2$ outlet as indicated at R, each of which may connect to the return circuit as indicated.

The tower 4 is connected to a water line as shown, and a suitable valve T is provided to regulate the flow. A 4N sulfuric acid supply tank is connected to the tower 6 and a suitable valve U is provided to regulate the flow. The leach solutions flow to the right through the several towers in series, and the tower 1 discharges through a filter and into a storage tank as shown. The calcined clay is initially introduced into the tower 1, and in accordance with counter-current leaching, the position of this tower will be periodically moved so that in sequence it will serially occupy each of the six positions illustrated. That is to say, that as the clay is gradually depleted, the towers are serially moved to the left in a regular succession, opposite to the direction of flow of the leaching.

From this flow sheet it will be seen that the leaching is accomplished in two sections which can be operated independently of each other so as to control the ratio of the sulfuric acid leach with respect to the alumina content of the final leach liquor.

During the sulfurous acid leach, sulfur dioxide is continuously bubbled through the leach liquor in each tower, at sufficient rate to constantly replenish the $SO_2$ as fast as it is neutralized by the alumina brought into solution, and to maintain saturation of $SO_2$ so as to assure efficient leaching. The leach liquor should enter the bottom of each tower so as to afford an upward flow, and additional water may be admitted so as to provide a greater volume of sulfurous acid leach, as it takes considerably more sulfurous acid to dissolve the required amount of alumina than the volume of sulfuric acid leach needed to dissolve the required amount of alumina in the form of a sulfate liquor. However, the amount of leach liquor can be kept at a minimum by passing the sulfate leach liquor into the sulfurous leach system where it will have not merely the same solvent properties as if no sulfate ion were present, but will actually increase the total concentration of alumina in solution.

As shown in the drawing, it is desirable to also circulate $SO_2$ through the sulfate leach towers 5 and 6. This is due to the fact that $Al_2O_3$ is soluble in aluminum sulfate solution and it is advisable to introduce $SO_2$ into the sulfate leach so as to preclude precipitation of a basic aluminum sulfate within the microscopic interstices of the clay, as that would greatly interfere with efficient leaching. In fact we have found that if $SO_2$ is omitted during the sulfuric acid leach, the liquor from the tower 5 will have less alumina concentration than the liquor from the tower 6, when properly the reverse should be the case, and will be the case when $SO_2$ is supplied to the sulfuric acid leach, in accordance with the present invention. In the absence of the $SO_2$ in the sulfuric acid leach, this objectionable precipitation will occur before the sulfuric acid is completely consumed and the remaining free sulfuric acid will pass over into the sulfite leach section where it is not needed, and maximum leaching efficiency will not be obtained. The presence of an adequate concentration of $SO_2$ in the sulfuric acid leach enables all of the sulfuric acid to be consumed in the sulfate leach section, so that free sulfuric acid does not pass over into the sulfite leach section where it is not needed. This not only assures maximum efficiency of the sulfate leaching but also eliminates the difficulties which would otherwise result from the formation of a precipitate in the interstices of the partially depleted clay.

When leaching is completed in the tower 6, it is disconnected from the series and occupies the position indicated at D where it is drained to recover the $H_2SO_4$ which is fed into the sulfate leach system as indicated. The drained tower D is then shifted to the position W where it is connected to the water supply line through the valve S and washed to recover any remaining $H_2SO_4$, the washings passing through the valve T and into the sulfurous acid leach system where any $H_2SO_4$ is promptly neutralized by the alumina therein. These valves S and T are shown as three-way valves so that they can be utilized to either pass the water direct to the sulfite leach system or else by-pass it indirectly through the wash tower W and then into the sulfite leach system, or both such flows can operate at the same time, if deemed advisable.

It is of course understood that, after the tower W has been washed free of $H_2SO_4$, the depleted residue is discarded, and this tower W is shifted to the position of leach tower 1 where it is supplied with calcined clay, and all of the other towers are then shifted one position to the left. It will also be understood that in actual practice, the several towers may be arranged in two rows so that the last tower is always adjacent to the first, and all shifts of relative positions can be made by changing the couplings or by a suitable system of valve connections. In actual practice the draining and washing is done in a single position, and it is only for the convenience of illustration that these two steps are shown in separate towers at D and W. Usually, there are several more towers in the sulfite leach system than the four here shown. The drawing is intended merely as a schematic diagram, and of course the present invention is not restricted to any particular arrangement of equipment, nor to any particular mode of operation. As for instance, the sulfate leach system may be separate from the sulfite leach system so that they may be operated independently of each other, and the two leach solutions separately collected and then mixed in the proper proportions to afford the aforesaid ratio of 5 equivalents of alumina to 1 equivalent of available sulfate ion. Other modes to the same end will readily suggest themselves, and the drawing is intended only as an example of a feasible mode of operation.

In actual practice, each of the leach towers is provided with a hot water jacket so as to maintain an operating temperature of approximately 55° C. For the sake of clarity, the hot water jackets are not shown on the flow sheet.

As shown in the drawing, the filtered sulfate-sulfite liquor is heated so as to expel the $SO_2$ and thus precipitate a basic aluminum sulfate, and the $SO_2$ is recycled as shown. This precipitation can be accomplished by boiling at atmospheric pressure until practically all of the $SO_2$ is expelled. It will of course be understood that the $SO_2$ may be expelled at whatever temperature and pressure found to be the most economically practical. Expelling the $SO_2$ causes the alumina to be precipitated as a basic aluminum sulfate and in granular form which can readily be separated from the mother liquor which carries off the iron as ferrous sulfate. This precipitation is preferably conducted in a closed tank, as that makes it readily possible to drain off the mother liquor and then wash the basic aluminum sulfate before removing it from the closed tank. This precludes oxidation of the ferrous sulfate during the washing and frees the basic aluminum sulfate from iron without resorting to any reagent to eliminate this impurity which is always present in the calcined clay and is unavoidably extracted along with the alumina.

The operation of the leaching system will be readily understood from the foregoing description and drawing, and once the counter-current leaching is established it is a simple matter to control the amount of $H_2SO_4$ admitted to the system, so as to maintain a ratio of approximately 5 equivalents of alumina to 1 equivalent of sulfate ion, which we have determined to be the optimum which assures maximum efficiency in the precipitation of basic aluminum sulfate. Fortunately, this 5 to 1 ratio is also within the range of efficient leaching. This ratio affords a leaching efficiency as high as 95% of the available alumina contained in a suitable clay, and also affords a precipitation efficiency as high as 98% of the alumina contained in the final sulfate-sulfite leach liquor. This 5 to 1 ratio is preferable, but it is also possible to increase or decrease the ratio within the limits of practical operation. The invention operates satisfactorily over a range of not less than one mole and not more than three moles of alumina, to each mole of sulfate ion. Thus the ratio may vary from as low as 5 equivalents to as high as 9 equivalents of alumina to each equivalent of sulfate ion. A ratio of 3 to 1 needlessly increases the amount of sulfuric acid required, and may also cause some of the alumina to be left in solution as aluminum sulfate instead of being precipitated as a basic aluminum sulfate in the intended manner. A ratio of 9 to 1 affords an increased saving of sulfuric acid at some sacrifice in leaching efficiency and at the risk that some basic aluminum sulfite may be included in the basic aluminum sulfate precipitated.

It will of course be understood that the ratio will depend upon the leaching characteristics of the particular clay being utilized. As for instance, the sulfite leaching should be limited to its range of efficient extraction, and the sulfate leaching need not be extended any farther than necessary to afford adequate extraction, the time element being considered in both instances. As an example, with a clay where the sulfite leaching becomes sluggish when 75% of the alumina content is exhausted, the sulfite leaching may therefore be limited to 72%, in which instance sulfate leaching of an additional 18% will afford 90% extraction and a 5 to 1 ratio. This may be taken as a typical example of actual operation. In some instances the sulfate leaching can be increased to 24% which will afford 96% extraction at a 4 to 1 ratio. Better than 96% extraction is seldom possible and less than 90% extraction is usually not desirable. However, with this same 72% sulfite leaching, a sulfate leaching of 12% affords 84% extraction and a 7 to 1 ratio, which is of course feasible. Likewise, a sulfate leaching of 9% will afford 81% extraction and a 9 to 1 ratio, which would seldom be considered as adequate extraction.

If the sulfite leaching be confined to 70%, a sulfate leaching of 17½% will afford 87½% extraction and a 5 to 1 ratio; and likewise, a sulfate leaching of 14% will afford 84% extraction and a 6 to 1 ratio; and a sulfate leaching of 23% will afford 92% extraction and a 4 to 1 ratio.

A ratio of 3 to 1 could be reached by a sulfite leaching of 64% and a sulfate leaching of 32% with 96% extraction which although possible would seldom be necessary in actual practice. As a general practice, the sulfate leaching is kept at the lowest practical minimum consistent with adequate extraction.

The described process has the advantage that the basic aluminum sulfate is heat precipitated directly from the combined leach liquor and there are no reagents to be recovered from the mother liquor. The precipitate is in granular form, free from slime, and can be readily filtered. This basic aluminum sulfate can be converted to whatever aluminum compound that may be required, and in fact two or more products can be produced at the same time. The drawing shows various modes of converting the basic aluminum sulfate to other aluminum compounds.

As indicated at B, the basic aluminum sulfate can be calcined to obtain anhydrous alumina, and the evolved $SO_3$ and $SO_2$ can be recovered for reuse.

We have also found that the basic aluminum sulfate can be converted into aluminum hydroxide by leaching with a base such as a solution of NaOH or KOH in sufficient amount to neutralize the sulfate ion, as indicated at A in the drawing; the resulting alkali sulfate solution can then be drained off and the aluminum hydroxide washed with water. We have also found that the sulfate ion can be efficiently extracted by leaching with an alkali carbonate such as a solution of $Na_2CO_3$ or $K_2CO_3$ as indicated at C. The resulting alkali sulfate solution can then be drained off and the aluminum hydroxide washed wtih water. The aluminum hydroxide produced by either of these modes can be readily converted into various other compounds such as acetate, chloride, etc., or anhydrous alumina can be produced by calcining the aluminum hydroxide.

The aluminum hydroxide described in the preceding paragraph being free from sulfates, it can readily be converted into a sulfate-free aluminate solution, from which alumina can be precipitated by carbon dioxide in the well known manner, or else by the well known Bayer process, each of which necessitates the absence of sulfates. For this purpose, it is not necessary that the aluminum hydroxide be free from iron, because all iron will be precipitated when the aluminum hydroxide is dissolved in a base such as a solution of NaOH or KOH used to convert the aluminum hydroxide into an aluminate, after which the silica can be removed in any well known manner, along with the iron which in some procedures will aid in the desilication.

We have found that the basic aluminum sulfate can be completely dissolved in an alkali hydroxide as indicated at K. Heating for 30 minutes at a temperature of 75° C. and a slight excess of 4N NaOH will convert practically all of the basic aluminum sulfate into a sodium aluminate solution. This affords considerable saving of reagents as compared with the straight sulfate process, which requires several times as much sulfuric acid and consequently a considerably greater quantity of alkali hydroxide. Thus the amount of reagents to be recovered in the present invention is considerably less than in the straight sulfate process. This same saving of reagents is accomplished when the previously described sulfate-free aluminum hydroxide is converted into an aluminate.

It is also possible to precipitate alumina from an aluminate solution in the presence of the sulfate ion. Thus the invention can be adapted to whatever procedure may be advisable for precipitating the alumina from the aluminate solution.

As shown at P, the basic aluminum sulfate can be converted into neutral aluminum sulfate by mixing with the required amount of $H_2SO_4$. In like manner, the showing at P can be made to produce either a mono-basic aluminum sulfate or else a dibasic aluminum sulfate, by employing the corresponding amount of sulfuric acid; and of course, other basic aluminum sulfates can also be prepared in this manner. Likewise, acid aluminum sulfate can be prepared by using correspondingly more sulfuric acid.

For extracting alumina from clays and other aluminiferous materials of the class described, the invention presents various advantages over straight sulfite leaching and also over straight sulfate leaching. Combined leaching with both sulfuric acid and sulfurous acid enables all of the sulfite ion to be expelled when the basic aluminum sulfate is precipitated, leaving none of this reagent to be recovered from the precipitate as is necessary in straight sulfite leaching which is also much less efficient in extracting the alumina from the calcined clay.

It will also be seen that unlike straight sulfate leaching, the leach liquor can be immediately converted into a solid precipitate containing the alumina, substantially free from iron, and carrying only a portion of the reagents used for leaching. Thus the expense of recovering the reagents is considerably less than for straight sulfate leaching wherein all of the leaching reagent must be recovered from the mother liquor. The invention affords the further advantage that the sulfate-sulfite leach liquor can be directly converted into one or more aluminum sulfates which are of utility as fillers in the paper industry.

The invention is primarily intended for clays but will also operate satisfactorily on various other aluminiferous materials which do not contain an appreciable amount of an acid constituent other than silica. As for instance, the invention will successfully extract alumina from high silica bauxite and bauxitic clays, and other ores of similar nature. It can also be employed to extract alumina from various byproducts of manufacture, as for instance, the residue discarded after separating titanium oxide from clays, which is usually accomplished by physical separation.

We claim as our invention:

1. A process of extracting alumina from a calcined siliceous aluminiferous material, which comprises counter-current leaching by first subjecting the calcined material to sulfurous acid leaching until partially exhausted, then subjecting the partially leached material to further leaching with sulfuric acid in the presence of sulfur dioxide, utilizing the sulfate leach liquor as a part of the solvent during the aforesaid sulfurous acid leaching step, controlling the amount of sulfuric acid so that the total alumina extracted will be in the ratio of approximately 5 equivalents of alumina to 1 equivalent of available sulfate ion, expelling sulfur dioxide from said leach liquor to precipitate the alumina as a basic aluminum sulfate, and separating said basic aluminum sulfate from the mother liquor.

2. A process of extracting alumina from a calcined siliceous aluminiferous material, which comprises subjecting the calcined material to sulfurous acid leaching until partially exhausted, then subjecting the partially leached material to further leaching with sulfuric acid in the presence of sulfur dioxide, combining said leach liquors in proper proportion to afford a sulfate-sulfite leach liquor containing approximately 5 equivalents of alumina to 1 equivalent of available sulfate ion, expelling sulfur dioxide from said sulfate-sulfite leach liquor to precipitate the alumina as a basic aluminum sulfate, and separating said basic aluminum sulfate from the mother liquor.

3. A process of extracting alumina from a calcined siliceous aluminiferous material, which comprises partially leaching said material with sulfurous acid, then subjecting the partially leached material to further leaching with sulfuric acid, combining said leach liquors in proper proportion to afford a sulfate-sulfite leach liquor containing approximately 5 equivalents of alumina to 1 equivalent of available sulfate ion, expelling sulfur dioxide from said sulfate-sulfite leach liquor to precipitate the alumina as a basic aluminum sulfate, and separating said basic aluminum sulfate from the mother liquor.

4. A process of extracting alumina from a calcined siliceous aluminiferous material, which comprises partially leaching said material with sulfurous acid, then subjecting the partially leached material to further leaching with sulfuric acid, combining said leach liquors in proper proportion to afford a sulfate-sulfite leach liquor containing more than one mole and less than three moles of alumina for each mole of available sulfate ion, expelling sulfur dioxide from said sulfate-sulfite leach liquor to precipitate the alumina as a basic aluminum sulfate, and separating said basic aluminum sulfate from the mother liquor.

5. In a process of extracting alumina from a calcined siliceous aluminiferous material, the steps which comprise counter-current leaching by subjecting the calcined material to sulfurous acid leaching until partially exhausted, then subjecting the partially leached material to further leaching with sulfuric acid in the presence of sulfur dioxide, and controlling the amount of sulfuric acid so that the total alumina extracted will be in the ratio of approximately 5 equivalents of alumina to 1 equivalent of available sulfate ion.

6. In a process for extracting alumina from a calcined siliceous aluminiferous material, the steps which comprise partially leaching said material with sulfurous acid, and thereafter leaching the partially exhausted material with sulfuric acid in the presence of sulfur dioxide, and combining the leach liquors in proper proporton to afford a sulfate-sulfite leach liquor containing more than one mole and less than three moles of alumina for each mole of available sulfate ion.

7. In a process for extracting alumina from a calcined siliceous aluminiferous material, the steps which comprise partially leaching said material with sulfurous acid, and thereafter leaching the partially exhausted material with sulfuric acid, and combining the leach liquors in proper proportion to afford a sulfate-sulfite leach liquor containing more than one mole and less than three moles of alumina for each mole of available sulfate ion.

8. A process of extracting alumina from a calcined siliceous aluminiferous material, which comprises partially leaching said material with sulfurous acid, then subjecting the partially leached material to further leaching with sulfuric acid, combining said leach liquors in proper proportion to afford a sulfate-sulfite leach liquor containing more than one mole and less than three moles of alumina for each mole of available sulfate ion, expelling sulfur dioxide from said sulfate-sulfite leach liquor to precipitate the alumina as a basic aluminum sulfate, separating said basic aluminum sulfate and washing the same with water, and digesting said basic aluminum sulfate with sufficient sulfuric acid to form a substantially soluble aluminum sulfate.

9. A process of extracting alumina from a calcined siliceous aluminiferous material, which comprises partially leaching said material with sulfurous acid, then subjecting the partially leached material to further leaching with sulfuric acid, combining said leach liquors in proper proportion to afford a sulfate-sulfite leach liquor containing more than one mole and less than three moles of alumina for each mole of available sulfate ion, expelling sulfur dioxide from said sulfate-sulfite leach liquor to precipitate the alumina as a basic aluminum sulfate, separating said basic aluminum sulfate from the mother liquor, removing the sulfate ion from said basic aluminum sulfate by leaching with a base capable of forming a soluble sulfate therewith, and washing the resulting aluminum hydroxide free of sulfate.

10. A process of extracting alumina from a calcined siliceous aluminiferous material, which comprises partially leaching said material with sulfurous acid, then subjecting the partially leached material to further leaching with sulfuric acid, combining said leach liquors in proper proportion to afford a sulfate-sulfite leach liquor containing more than one mole and less than three moles of alumina for each mole of available sulfate ion, expelling sulfur dioxide from said sulfate-sulfite leach liquor to precipitate the alumina as a basic aluminum sulfate, separating said basic aluminum sulfate from the mother liquor, removing the sulfate ion from said basic aluminum sulfate by leaching with a solution of an alkali carbonate capable of forming a soluble sulfate therewith, and washing the resulting aluminum hydroxide free of sulfate.

11. A process of extracting alumina from a calcined siliceous aluminiferous material, which comprises partially leaching said material with sulfurous acid, then subjecting the partially leached material to further leaching with sulfuric acid, combining said leach liquors in proper proportion to afford a sulfate-sulfite leach liquor containing more than one mole and less than three moles of alumina for each mole of available sulfate ion, expelling sulfur dioxide from said sulfate-sulfite leach liquor to precipitate the alumina as a basic aluminum sulfate, separating said basic aluminum sulfate and dissolving it in a solution of a base capable of forming a soluble aluminate therewith.

12. A process of extracting alumina from a calcined siliceous aluminiferous material, which comprises partially leaching said material with sulfurous acid, then subjecting the partially leached material to further leaching with sulfuric acid, combining said leach liquors in proper proportion to afford a sulfate-sulfite leach liquor containing more than one mole and less than three moles of alumina for each mole of available sulfate ion, expelling sulfur dioxide from said sulfate-sulfite leach liquor to precipitate the alumina as a basic aluminum sulfate, separating said basic aluminum sulfate and washing the same with water, and calcining said basic aluminum sulfate to produce anhydrous alumina.

13. A process of extracting alumina from a calcined siliceous aluminiferous material, which comprises counter-current leaching by first subjecting the calcined material to sulfurous acid leaching until partially exhausted, then subjecting the partially leached material to further leaching with sulfuric acid in the presence of sulfur dioxide, utilizing the sulfate leach liquor as a part of the sulfurous acid leaching, controlling the amount of sulfuric acid so as to produce a final sulfate-sulfite leach liquor containing more than three equivalents and less than nine equivalents of alumina ions to each equivalent of available sulfate ions, expelling sulfur dioxide from said leach liquor to precipitate the alumina as a basic aluminum sulfate, and separating said basic aluminum sulfate from the mother liquor.

14. A process of extracting alumina from a calcined siliceous aluminiferous material, which comprises partially leaching said material with sulfurous acid, then subjecting the partially leached material to further leaching with sulfuric acid, combining said leach liquors in proper proportion to afford a sulfate-sulfite leach liquor containing more than one mole and less than three moles of alumina for each mole of available sulfate ion, expelling sulfur dioxide from said sulfate-sulfite leach liquor to precipitate the alumina as a basic aluminum sulfate, separating said basic aluminum sulfate from the mother liquor, removing the sulfate ion from said basic aluminum sulfate by leaching with a base capable of forming a soluble sulfate therewith, washing the resulting aluminum hydroxide free of sulfate, and dissolving said sulfate-free aluminum hydroxide in a solution of a base capable of forming a soluble aluminate therewith, whereupon the alumina can be precipitated by any method requiring a sulfate-free aluminate solution.

15. A process of extracting alumina from a calcined siliceous aluminiferous material, which comprises partially leaching said material with sulfurous acid, then subjecting the partially leached material to further leaching with sulfuric acid, combining said leach liquors in proper proportion to afford a sulfate-sulfite leach liquor containing more than one mole and less than three moles of alumina for each mole of available sulfate ion, expelling sulfur dioxide from said sulfate-sulfite leach liquor to precipitate the alumina as a basic aluminum sulfate, separating said basic aluminum sulfate from the mother liquor, removing the sulfate ion from said basic aluminum sulfate by leaching with a solution of an alkali carbonate capable of forming a soluble sulfate therewith, washing the resulting aluminum hydroxide free of sulfate, and dissolving said sulfate-free aluminum hydroxide in a solution of a base capable of forming a soluble aluminate therewith, whereupon the alumina can be precipitated by any method requiring a sulfate-free aluminate solution.

OTTO REDLICH.
MARK F. ADAMS.
EDWARD K. HOLT.

REFERENCES CITED

The following references are of record in the file of this patent:

UNITED STATES PATENTS

| Number | Name | Date |
|---|---|---|
| 245,750 | Semper | Aug. 16, 1881 |
| 1,077,309 | Schwahn | Nov. 4, 1913 |
| 1,249,125 | Langford | Dec. 4, 1917 |
| 1,964,382 | Fleischer | June 26, 1934 |
| 2,021,546 | Fluda et al. | Nov. 19, 1935 |
| 2,224,888 | Walthall | Dec. 17, 1940 |
| 2,476,979 | Hoeman | July 26, 1949 |

FOREIGN PATENTS

| Number | Country | Date |
|---|---|---|
| 312,726 | Great Britain | June 6, 1929 |

OTHER REFERENCES

Tilley et al., "Acid Processes For The Extraction Of Alumina," U. S. Bureau of Mines Bulletin 267, pages 33 to 41, published by U. S. Gov. Printing Office, Washington, D. C., 1927.